Oct. 18, 1966

J. B. BLACKMON, JR., ETAL 3,279,253

DIELECTROPHORETIC PROPELLANT ORIENTATION SYSTEM

Filed Dec. 3, 1963

INVENTORS
JAMES B. BLACKMON, JR.
JEREMY F. CROCKER
JAMES C. MOULE
DAVID E. KNAPP

BY

Leon D. Rosen

- ATTORNEY -

Oct. 18, 1966 J. B. BLACKMON, JR., ETAL 3,279,253
DIELECTROPHORETIC PROPELLANT ORIENTATION SYSTEM
Filed Dec. 3, 1963 2 Sheets-Sheet 2
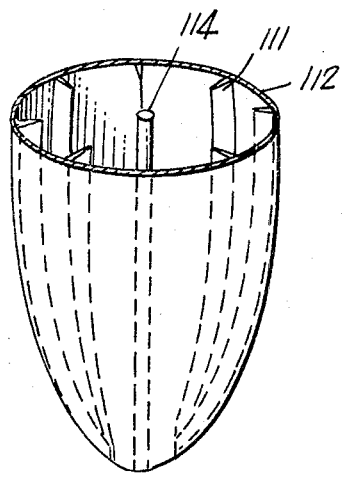
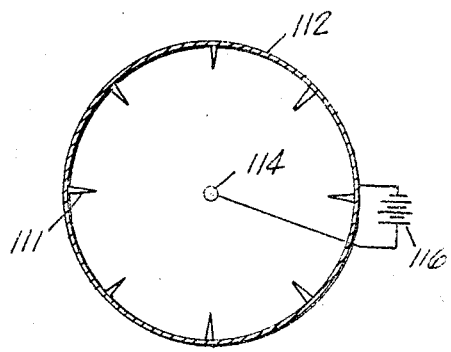
Fig. 5. Fig. 6.
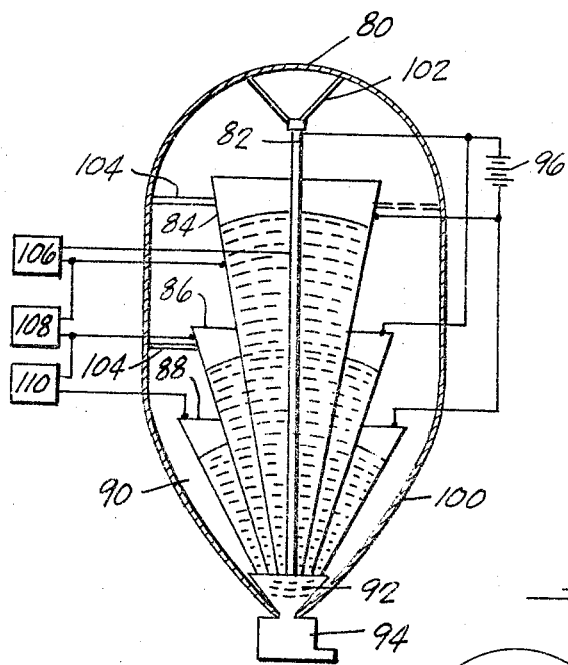
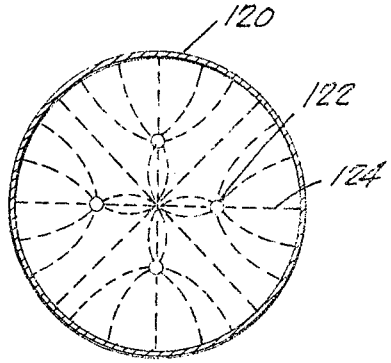
Fig. 7. Fig. 8.
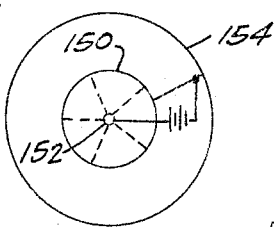
Fig. 9.
INVENTORS
JAMES B. BLACKMON, JR.
JEREMY F. CROCKER
JAMES C. MOULE
DAVID E. KNAPP
BY
Leon D. Rosen
- ATTORNEY -

# United States Patent Office 3,279,253
Patented Oct. 18, 1966

3,279,253
DIELECTROPHORETIC PROPELLANT
ORIENTATION SYSTEM
James Bertram Blackmon, Jr., and David E. Knapp, Los Angeles, and James C. Moule, Malibu, Calif., and Jeremy F. Crocker, Yellow Springs, Ohio, assignors to Douglas Aircraft Company, Inc., Santa Monica, Calif.
Filed Dec. 3, 1963, Ser. No. 327,770
7 Claims. (Cl. 73—304)

This invention relates to liquid orienting or gathering systems for use in low or zero gravity environments, and more particularly to systems which employ the forces of electric fields.

The control of liquids under zero gravity conditions is very troublesome in those applications where the vessel which holds the liquid is not completely filled. For example, the orientation of liquids is very important in the control of liquid propellants, especially where they are used in rockets which require multiple in-flight engine restarts. Prior to engine restart in zero gravity, the propellant must be oriented around the tank outlet so as to provide a constant flow of propellant to the engine. If the propellant is not properly oriented around the tank outlet, vapor may be pumped into the engine instead of liquid propellant and a mixture of fuels may be obtained which is far from the optimum ratio, or which is explosive.

Various propellant orientation systems have been proposed for orienting liquid under zero gravity conditions, including the use of artificial gravity fields produced by spinning or accelerating the vehicle, bellows, bladders, piston tanks or capillary devices. However, all of these systems employ heavy components and require the expenditure of considerable energy, especially when the number of engine restarts is great. Furthermore, these systems generally require that a large amount of the liquid be gathered to assure that no vapor is pumped, even when only a small amount is needed. This invention provides for a propellant orientation system which is very light in weight, which requires only a small expenditure of energy for its operation, and which permits the gathering of small quantities of vapor-free liquid when desired.

The system of this invention employs primarily the phenomenon of dielectrophoresis, which concerns the motion of electrically neutral bodies under the influence of a non-uniform electric field. When an uncharged or electrically neutral body is placed in a non-uniform electric field (and the body has a dielectric constant greater than that of its surroundings), it moves toward the areas of higher field intensity. The force on the neutral body is due to the fact that the field polarizes all the molecules of the body so that there are effective electric charges on opposite sides thereof. Inasmuch as the field is non-uniform the effective charges on one side of the body (e.g., of a negative polarity) are attracted with greater force than the effective charges (e.g., of a positive polarity) on the other side of the body and there is a net force on the body to cause it to move. In this invention non-uniform electric fields are produced in a liquid propellant tank through the utilization of properly designed electrodes and a high-voltage power supply connected between them. An outlet valve leading to the engine is provided at an area of high electric field so that propellant can be kept adjacent the valve. If a virtually non-conducting liquid propellant is utilized, very little current is employed in the operation of the device and a simple low-power and low-weight system is sufficient to orient the propellant.

The phenomenon of dielectrophoresis is utilized by the present invention to orient liquid propellant, very little energy being employed. However, more force can be applied to the liquid for more rapid gathering, by the use of the phenomenon of electrophoresis, which is the phenomenon of the attraction of charged bodies in an electric field. Both phenomena may be employed in some embodiments of the present invention to obtain a propellant orientation system having the collecting power and low energy requirements needed in any particular application.

Accordingly, one object of the present invention is to provide a liquid orientation system for use in zero gravity environments which employs a minimum of equipment and energy in its operation.

Another object of the present invention is to provide a propellant orientation system for use under gravity-free conditions, which employs no moving machinery.

A further object of the present invention is to provide a propellant orientation system for use under zero gravity conditions wherein the only object moved is the propellant to be oriented.

A still further object is to provide a liquid orientation system for use under zero gravity conditions wherein forces used to orient the liquids are produced by the phenomena of dielectrophoresis and/or electrophoresis.

These and other objects and a more complete understanding of the invention may be had by reference to the following description and claims taken in conjunction with the accompanying drawings in which:

FIG. 5 is a third embodiment of the invention, similar to the embodiment of FIG. 1 but including corona projections to utilize the phenomenon of electrophoresis.

FIG. 6 is a cross-sectional view of the embodiment of FIG. 5.

FIG. 7 is a slide elevational view of another embodiment of the invention which is especially useful for measuring the quantity of fluid remaining in a tank.

FIG. 8 is a cross-sectional view of an embodiment of the invention using several gathering electrodes.

FIG. 9 is a cross sectional view of an embodiment which employs a second electrode around the first to serve as the liquid-vapor interface.

Figure 1:
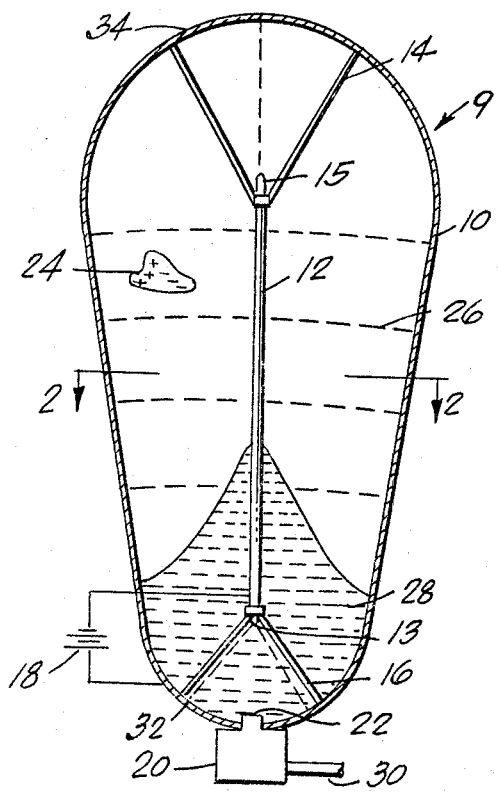
FIGURE 1 is a sectional, elevational view of a propellant tank constructed in accordance with the present invention.
Figure 2:
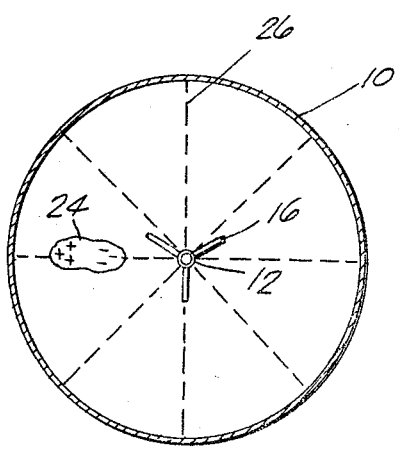
FIG. 2 is a cross-sectional view of the tank of FIG. 1 taken on the line 2—2.

With reference to the drawings wherein like parts are identified by like reference numerals and especially to FIGS. 1 and 2 which illustrate a first embodiment of the invention, the present invention comprises a tank 9 including an outer tank wall 10 formed in a generally tapered cylindrical shape, for holding liquids such as a liquid propellant. At least a part of the inner surface of the wall 10 is of an electrically conductive material. The tank is mounted in a vehicle which is to be used under low or zero gravity conditions; for example, the tank 9 may serve as a propellant carrier on a rocket booster. A center electrode 12 having a rod shape with rounded ends is positioned along the axis of the tank 9, the rod ends 13 and 15 being spaced from the ends 32 and 34, respectively, of the tank wall, each rod end spaced a distance approximately equal to the radius of curvature of the adjacent end of the tank. The end portion 15 of the center electrode 12 is held a fixed distance from the large end 34 of the tank wall 10 by a support member 14. The support member 14 forms a tripod, the apex of which includes a sleeve disposed about the center electrode 12 and fixed to it, the foot of each of the three tripod legs being fastened to the outer tank wall 10. The end 13 of the electrode 12 which is adjacent the small end 32 of the tank wall 10 is also supported by a tripod-like support 16 which is similar to the support member 14.

A pump 20 mounted on the narrow end 32 of the tank wall 10 includes an inlet 22 opening into the interior of the tank and an outlet 30 which leads to the combustion chamber of a rocket motor or other device to which the contained liquid is to be pumped.

A high-voltage supply 18 is electrically connected to the outer tank wall 10 and the center electrode 12 so that the electrode 12 is maintained electrically positive with respect to the outer tank wall 10. The voltage supply may be an electronic voltage boosting supply or the like, operating from a source such as batteries, and may supply either direct or alternating current. Generally the voltage supply 18 produces a voltage of the order of 100,000 volts for a tank radius of approximately 3 feet. Although some dielectrophoretic gathering occurs at lower voltages, usually at least 50,000 volts is required in this application for gathering within a period of time short enough for practical application of the phenomenon, the actual voltage needed depending to a large extent on the geometry and size of the tank system. The large potential difference between the tank wall 10 and the center electrode 12 which is disposed along its axis, creates a strong electric field between them. The lines of the electric field are represented by field lines 26 which are perpendicular to equipotential surfaces of the field.

The electric field established in the tank is non-uniform in two respects. First, the field lines 26 converge towards the center of the tank where the electrode 12 is located. This can be seen in FIG. 2 which shows how the lines radiate from the center electrode 12, the lines being further apart as they approach the outer tank wall 10. Second, the electric field is non-uniform in that the strength of the field increases toward the narrow end 32 of the tank wall 10. The increase in field strength toward the narrow end of the tank is due to the fact that the distance between the center electrode 12 and tank wall 10 is smaller at the narrow end 32 than elsewhere while the potential difference between the electrode 12 and tank wall 10 is constant. As a result, the field strength, which is generally the ratio of potential difference to distance between electrodes, increases.

If the tank shown in FIGS. 1 and 2 is located in an environment of zero or almost zero gravity and acceleration, and if the tank is partially filled with a liquid, there is great likelihood that initially the liquid will be in a state consisting of globules floating in vapor, the possible sizes of globules lying within a very wide range, from microscopic to almost the size of the inside of the tank. Globules are especially likely to form under circumstances where shock is imparted to the tank as by vibrations caused by an operating rocket or by the sudden deceleration resulting from the termination of the firing of a rocket. A globule of liquid such as globule 24 is generally uncharged or electrically neutral. The position of the globule 24 in the electric field causes its polarization; that is, that portion of the globule nearest the positively charged center electrode 12 effectively acquires a negative charge while the portion of the globule nearest the negatively charged outer wall 10 effectively becomes positively charged. The charges on opposite sides of the globule 24 are equal because there are equal quantities of positive and negative charges in a neutral body.

The negatively charged portion of the globule 24, marked with minus signs, is attracted to the electrode 12 while the positively charged portion, marked with plus signs, is attracted to the tank wall 10. If the globule 24 were in a uniform electric field the forces on the negatively charged portion and positive portion would be equal and the net force on the globule would be zero. However, when the globule 24 is in a non-uniform electric field, that portion of the globule which is in a stronger part of the field experiences a larger attractive force than that part of the globule which is in the weaker part of the field. The globule 24 is so polarized that the radially inner portions which are closest to the positively charged center electrode 12, are of negative polarity while the portions facing the negatively charged outer tank wall 10 are of positive polarity. As illustrated in FIG. 2 the field lines converge and the electrical field is stronger at locations closer to the center electrode 12 or radially inward area as compared to radially outward portions closer to the tank wall 10. Thus the negatively charged portions of the globule 24 are in a stronger electric field than are the positively charged portions, and the globule 24 experiences a net force in the radially inward direction or toward the center electrode 12. Accordingly, globules 24 drift toward the center electrode, and displaced vapor is pushed toward the radially outward portions of the tank. This phenomenon is an example of dielectrophoresis.

The electric field is of greater intensity toward the narrow end 32 of the tank where the distance between the center electrode 12 and outer tank walls 10 is relatively small. As a result, the globules 24 not only drift toward the center electrode 12 but drift toward the narrow end portion 32 of the tank. After the liquid is gathered, it is likely to form a large mass located in the area of maximum field intensity. After sufficient time has elapsed during which the electric field has been maintained, all of the propellant 28 is gathered to the narrow end 32 of the tank where it may be easily pumped by the pump 20.

As the remaining propellant 28 is withdrawn from the tank the level remaining above the inlet 22 decreases. However, all of the remaining propellant is concentrated at the narrow end 32 above the inlet 22 so that all of the remaining liquid propellant may be pumped out of the tank without pumping quantities of vapor.

The center electrode 12 has been described and illustrated as a large diameter rod with rounded ends. The reason for providing such a shape is to assure that there are no areas of very high field intensity such as would cause the ionization of the vapor or liquid and leakage of current. If the electrode 12 were of very small diameter the field lines as shown in FIG. 2 would converge to almost a point and the field intensity around this point would be very very high. The purpose of providing rounded ends is similarly to prevent establishment of very high field intensities.

The described and illustrated electrode 12 is positioned so that its end portions are spaced from the ends 32 and 34 of the tank wall 10. The reason for spacing one end of the electrode 12 a distance from the large end 34 of the tank wall is to prevent a large field intensity therebetween which would attract liquid propellant to that area. The smaller the distance between the electrode 12 and the nearest portion of the tank wall 10, the higher the field intensity. Inasmuch as globules tend to move toward portions of high field intensity and it is desired to move the globules toward the narrow end 32, it is desirable to maintain the field at the large end 34 at approximately the minimum field in the entire enclosed portion of the tank. The end 13 of the electrode 12 nearest the narrow end 32 of the tank is maintained fairly close to the tank wall so that a fairly high field intensity is established therebetween. However, a sufficient distance is maintained to prevent very high field intensities and ionization. The ideal field intensity is an intensity slightly higher than the intensity in any other portion of the tank. Accordingly, the distance between the end of the electrode 12 and the narrow portion 32 of the tank wall is slightly less than the distance between the electrode and tank wall at any other portion.

Although a tapered cylindrical shape of which is illustrated, a simple cylindrical shape may be employed. In that case it is preferable to include a liquid pumping means disposed along or even within the center electrode 12 instead of at only one end thereof. The entire wall 10 need not be electrically conductive; a sheet of conductive material covering a large portion of the inside surface of the tank wall and adjacent it or spaced a small distance from it may be used instead. The shape of the tank can be any of a variety of forms other than cylindrical or conical, inasmuch as liquid will gather wherever the maximum field is located.

Figure 3:
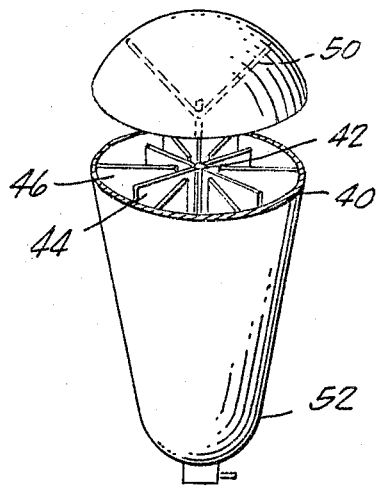
FIG. 3 is a pictorial, partially sectional view of a second embodiment of the invention.
Figure 4:
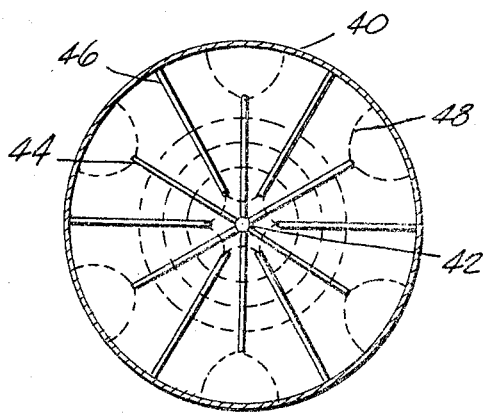
FIG. 4 is a cross-sectional view of the second embodiment shown in FIG. 3.

The embodiment described hereinbefore is useful for gathering propellant using the phenomenon of dielectrophoresis. However, the gathering process is very slow and it is often desirable to provide a greater field gradient or faster change of field intensity per unit distance in order to ennable the more rapid movement of propellant. A second embodiment of the invention shown in FIGS. 3 and 4 employs two groups of electrically charged field increasing members 44 and 46. The field increasing members shown have the form of plates and provide a more rapid change of field intensity with distance from the center of the tank than the single electrode 12 of FIGS. 1 and 2, thereby enabling the more rapid movement of liquid propellant. The second embodiment is otherwise similar to the first embodiment described hereinabove. The groups of members, or plates in the embodiment shown, includes a group of conductive outer plates 46 fastened and electrically connected to the inside of the tank wall 40 and extending in a radially inward direction. Another group of conductive inner plates 44, extending in a radial direction, is attached to the center electrode 42 and interspaced between the outer plates 46. The electrode 42 is charged relative to the tank wall 40 with a high voltage supply. As a result, the inner plates 44 are charged positively with respect to the outer plates 46 and a field is established therebetween, the field lines being shown at 48.

The field created within the tank is stronger where the plates are closer together, which is toward the radially inner portions of the tank. Thus, globules of liquid between the plates are attracted toward the center electrode 42. The radially outer portions of the inner plates 44 extend toward the outer tank wall 40 but end a considerable distance from the tank wall. The reason for extending the plates to only this distance is to prevent a strong field between the radially outer edges of the inner plates 44 and the tank wall, such a field being undesirable inasmuch as it would attract globules to that area instead of to the center of the tank. The radially inner portions of the outer plates 46 extend to within a small distance of the center electrode 42. The inward extension of the plates 46 is limited by the strength of the field created as the distance between the plates 46 and center electrode 42 decreases, a very strong field being undesirable where ionization of the liquid or vapor is undesirable.

Because of the tapered shape of the tank, globules are attracted not only toward the center electrode 42 but also toward the narrow end 52 of the tank where a pump and other apparatus similar to that shown in FIG. 1 are located. The provision of plates 44 and 46 not only increases field non-uniformity but also serves to increase cohesion of liquid to the center by capillary action, especially when many plates are used and the angles between them are small. Although two groups of plates are shown, one group such as 44 without the other 46, increases field non-uniformity and decreases liquid gathering or collection time.

A third embodiment of the invention shown in FIG. 7 includes a series of several cone-shaped electrodes for enabling the measurement of the quantity of propellant at any given time, in addition to enabling the more rapid gathering of propellant. This embodiment includes a tank wall 80 defining a generally cylindrical tank having a conically shaped gathering end 100, a central electrode 82, and three conical electrodes 84, 86, and 88 concentrically located about the central electrode. The central electrode 82 is held to the tank wall 80 by brackets 102 similar to the brackets described in connection with FIG. 1. The conical electrodes 84 and 86 are each held by three insulating brackets 104 which are fixed to the tank wall 80 and the outer surface of the conical electrodes 84 and 86. The electrode 88 is held by an insulating layer 90 disposed between it and the gathering end 100 of the tank wall. The layer 90 also prevents movement of liquid between the gathering end 100 of the tank and the electrode 88 where it could not be readily measured. One end of each electrode 82, 84, 86, and 88 is held by an insulating support 92. A high-voltage supply 96 maintains a potential difference between the center electrode 82 and the first conical electrode 84, between the first and second conical electrodes 84 and 86, and between the second and third conical electrodes 86 and 88. Globules of liquid within the tank wall 80 are moved toward the regions of high electric field intensity which are the apexes of the cone-shaped electrodes where the distance between electrodes is smallest. When the tank is about one-half full of liquid, all of the remaining liquid can be gathered within the boundaries defined by the conical electrodes. After a certain period of time during which an electric field is maintained in the manner described hereinabove all of the remaining liquid is gathered between the electrodes.

Three capacitance measuring devices 106, 108, and 110 are provided, each of which is connected between two adjacent electrodes in the group 82, 84, 86, and 88. Any simple capacitance measuring device may be used, as for example an oscillator circuit supplying alternating current of given frequency in series with an A.C. voltmeter calibrated to read capacitance or amount of remaining liquid for the frequency of the oscillator used. The dielectric constants of liquids (e.g. 1.25 for liquid hydrogen and 1.53 for liquid oxygen) are always higher than that of vacuum, air or vapor, all of which are about 1. Thus when liquid is located between two electrodes the capacitance between them is much larger than the capacitance between electrodes when only vacuum, air or vapor is located therebetween. Furthermore, the capacitance between two electrodes is a direct function of the amount of liquid between the electrodes. Inasmuch as the dielectric constant of the liquid propellant being used is known and the capacitance characteristics of each system of adjacent electrodes is known either by theoretical calculations or by experimentation, and inasmuch as the capacitance betwen adjacent electrodes is a direct function of the liquid gathered between them, one can determine the quantity of liquid by merely measuring the capacitance between each set of adjacent electrodes. Therefore at any time after the liquid propellant has been gathered between the conical electrodes, three capacitance measurements may be taken and the total remaining liquid easily determined.

After liquid has been gathered it flows through the support 92 to a pump 94. The support 92 includes rigid insulator portions for holding the apexes of the electrodes rigidly, but also includes numerous large passageways to enable the liquid to flow therethrough. After being gathered the liquid is pumped to a location where it is needed, by the pump assembly 94.

For large tanks where excessively high voltages would have to be applied to obtain the required electric field intensity if only one central electrode were used, several center electrodes may be employed. FIG. 8 for example, shows a tank wall 120 which encloses four uniformly spaced electrodes 122. The electric field lines converge toward the enclosed electrodes, so that liquid moves toward them. The distance between the enclosed electrodes 122 and the tank wall 120 is smaller for a given voltage difference than would be the case for a single, axially located electrode. Gathering pumps similar to the pump 20 of FIG. 1 are situated at the end of each enclosed electrode 122. Alternatively, the electrodes 122 can be connected together at one end of the tank so that the liquid flows to one gathering location and only one pump need be employed.

Another embodiment of the invention shown in FIGS. 5 and 6 is similar to the first embodiment of FIGS. 1 and 2 but also includes corona-producing projections 111 for producing local, high intensity electric fields to cause ionization. The projections enable the more rapid gathering of propellant by employing electrophoresis, the phenomenon concerning the movement of charged particles in an electric field. This embodiment includes a tank wall 112, a central electrode 114 and a voltage source 116 between them. In the embodiment illustrated in FIGS. 5 and 6 the corona projections 110 are wedge or spike shaped plates of electrically conductive material fastened to the inside of the tank wall 112.

The voltage source 116 is so connected that the tank wall 112 has a negative potential with respect to the central electrode 114. Thus, the corona projections 111 have a high negative potential. The projections 111 include sharp edges which create electric fields around them of extremely high intensity. As a result, the vapor immediately surrounding the edge of a projection is caused to become ionized and thus a conductor of charges. When globules of liquid approach these areas of ionization, electricity is easily conducted to them. Inasmuch as the projections 111 are negatively charged, electrons flow to the surface of the globules and they become negatively charged. The negatively charged globules are strongly repelled by the tank walls 112 which are also negatively charged. As a result the globules move toward the center electrode 114 relatively rapidly. In this manner liquid can be gathered at a fairly rapid rate. The larger gathering forces produced in electrophoretic orientation are often useful in dislodging globules held by capillary action to the tank wall 112, and may be employed for only short periods of time to dislodge globules, after which only dielectrophoresis is employed.

In experiments conducted with sharp-edged electrodes in small tanks of about one-half foot diameter, it has been found that the phenomenon of electrophoresis is significant only for voltage between the center electrode and tank wall of more than about 2,000 volts. Of course, the actual minimum voltage depends on the geometry of the tank system, the sharpness of the corona projection or other electrodes, the ionization potential of the liquid, its degree of impurity (the greater the impurity the lower the voltage needed) and other factors. However, the fact that electrophoresis often becomes quickly apparent with increase in voltage shows that a tank ordinarily employing dielectrophoresis may be made to employ electrophroesis temporarily as by raising the applied voltage. Although special corona projections increase the uniformity and predictability of electrophoretic effects, a rough surface on an otherwise smooth-surfaced electrode causes ionization with only a moderate increase in applied voltage.

One of the primary advantages of dielectrophoretic orientation, described in connection with the first three embodiments presented herein, is that very small amounts of power are required, even though high voltages are employed. The reason why only small amounts of power are consumed is that the typical liquid propellant with which the system is used is a very poor conductor when relatively free of impurities, so that very little current flows between the electrodes. In the case of electrophoretic orientation which is used in the embodiment shown in FIGS. 5 and 6, substantially more power is required to ionize the vapors immediately surrounding the corona-producing devices and to charge the globules of liquid. However, even in the case of electrophoretic orientation, relatively small amounts of power are required as compared to prior systems. If only a small amount of liquid need be gathered, as in restarting an engine which provides accelerating forces to further gather liquid after firing, voltage may be applied for only a short period of time, as for example only a few minutes before engine restart, thereby reducing power consumption.

Although the invention has been shown used in connection with cylindrical or conically shaped tanks, obviously it may be employed in a wide variety of configurations of tanks or other enclosures or even in open spaces to gather liquids, powders or other substances held in a bulk form, if they are of a higher dielectric constant than their surroundings, to an area or point of concentration.

In the operation of the gathering systems, direct current is generally used inasmuch as it is readily available from atomic batteries and the like. In the operation of the system with direct current, it is often found that an unstable condition is attained wherein liquid at the outer surface of the collected liquid mass travels back and forth between the tank wall and the collected liquid mass. The cause of this phenomenon is that most liquids are slightly electrically conductive and current or charges flow from the central electrode to the liquid at the periphery of the gathered liquid mass. The vapor is an extremely poor electrical conductor, so charges build up on the liquid at the liquid-vapor interface. The charged liquid breaks away from the mass of gathered liquid and moves through the vapor to the outer tank wall where it gives up its charge. The liquid globule then is attracted back to the gathered mass where the phenomenon is repeated.

The unstable condition caused by charge build up at the liquid-vapor interface is prevented by repeatedly changing the polarity of the central electrode. When the polarity of the central electrode is changed, any charges at the periphery of the liquid mass move inwardly, and the periphery portion is momentarily neutral until a charge of opposite polarity builds up. Of course, the alternation must be rapid enough so that charges do not have a chance to build up before polarity is reversed. The time required for an excessive build up varies with the conductivity and dielectric constant of the liquid, the size of the tank, and other factors. For tanks of the sizes normally employed for rockets, which have a diameter of a general magnitude of several yards, and typical fluids, the time required for excessive charge build-up is generally of a magnitude of one to one-hundredth second. Accordingly, if alternating current of a frequency of about five to five hundred cycles per second is employed, unstable liquid orientation is eliminated in most cases.

The unstable condition may also be eliminated in a manner illustrated in FIG. 9 by placing a cylindrical stability shell 150 around the center electrode 152 which is of about the same potential as the outer tank wall 154. If the cylindrical shell is properly placed, it generally will form the liquid-vapor interface, draw off charges building up at the periphery of the gathered liquid mass, and block outward movement of liquid. Direct current can thus be used without the creation of an unstable gathering condition.

Accordingly, while certain advantageous embodiments of the invention have been chosen for illustration, it will be understood by those skilled in the art that various changes and modifications therein can be made without departing from the scope of the invention as defined in the appended claims.

We claim:

1. A fluid orientation system for orienting fluids comprising:

a tank shell for holding liquid, said tank shell having inner walls constructed of electrically conductive material;

a first electrode positioned within said tank shell and spaced from said inner walls;

electrical voltage producing means connected between said tank shell and said first electrode for producing an electric potential therebetween, said first electrode having a shape and a position within said tank shell such that when it is charged relative to said tank walls a non-uniform electric field is produced between said walls and said first electrode; and at least one conical-like, tapered secondary electrode disposed about said first electrode, spaced from said first electrode, and spaced from said tank shell, said secondary electrode electrically charged relative to said first electrode.

2. A liquid orientation system as defined in claim 1 including:

capacitance measuring means for measuring the capacitance existing between said first and secondary electrodes, whereby the amount of liquids situated therebetween is determinable.

3. A liquid orientation system for orienting fluids comprising:

a tank shell for holding liquid, said tank shell having inner walls including electrically conductive material;

a first electrode positioned within said tank shell and spaced from said walls;

a stability shell positioned at least partially around said first electrode and spaced from said first electrode, said stability shell also spaced from the inner walls of the tank shell; and high voltage producing means connected between said first electrode and said stability shell and tank walls for producing an electric potential or charge between said electrode and said stability shell, said first electrode and stability shell having shapes and positions such that when they are charged relative to each other an electric field is produced between them, said electric field between them being of substantially higher intensity than any electric fields between said stability shell and said tank walls.

4. A liquid orientation system for orienting fluids comprising:

a tank shell for holding liquid, said tank shell having inner walls including electrically conductive material;

a first electrode positioned within said tank shell and spaced from said walls;

high voltage producing means connected between said tank shell and said electrode for producing an electric potential or charge therebetween; and at least one conical-like, tapered secondary electrode disposed about said first electrode, spaced from said first electrode, and spaced from said tank shell, said secondary electrode electrically charged relatively to said first electrode.

5. A fluid orientation system for orienting fluids comprising:

a tank shell for holding liquid, said tank shell having inner walls constructed of electrically conductive material;

a first electrode positioned within said tank shell and spaced from said inner walls;

electrical voltage producing means connected between said tank shell and said first electrode for producing an electric potential therebetween, said first electrode having a shape and a position within said tank shell such that when it is charged relative to said tank walls a non-uniform electric field is produced between said walls and said first electrode; and second electrodes positioned within said tank shell and spaced from the walls of said shell, spaced from said first electrode, and spaced from each other, each of said second electrodes charged relative to said tank walls, each second electrode being equiangularly positioned with respect to each other and each being spaced from said first electrode an equal distance.

6. The fluid orientation system for orienting fluids of claim 5 including:

said second electrodes being at least three in number.

7. A fluid orientation system for orienting fluids comprising:

a tank shell for holding liquid, said tank shell having inner walls constructed of electrically conductive material;

an electrode positioned within said tank shell and spaced from said inner walls;

electrical voltage producing means connected between said tank shell and said electrode for producing an electric potential therebetween, said electrode having a shape and a position within said tank shell such that when the electrode is charged relative to said tank walls a non-uniform electric field is produced between said walls and said electrode;

a plurality of first, radially extending, electrically conductive field increasing members attached to said electrode;

a plurality of second radially extending, electrically conductive field increasing members mounted on said shell and being disposed between said first members;

said first and second members being spaced from each other in an overlapping arrangement; and said first and second field increasing members being plate-shaped and extending substantially the length of both said electrode and tank shell.

References Cited by the Examiner
UNITED STATES PATENTS

| | | | |
|---|---|---|---|
| 2,042,887 | 6/1936 | Fisher et al. | 204—299 |
| 2,050,301 | 8/1936 | Fisher | 204—299 |
| 2,440,455 | 4/1948 | White | 55—2 |
| 2,851,618 | 9/1958 | Krawinkel | 317—362 |
| 2,894,175 | 7/1959 | Lamm | 317—3 |
| 3,054,697 | 9/1962 | Irland et al. | 317—3 |
| 3,202,160 | 8/1965 | Barger | 310—2 X |

LOUIS R. PRINCE, *Primary Examiner.*

C. C. ELLS, S. H. BAZERMAN, *Assistant Examiners.*